United States Patent [19]

Anderson et al.

[11] 4,307,508

[45] Dec. 29, 1981

[54] METHOD OF ASSEMBLING AND MOUNTING A SWITCH AND TERMINAL ASSEMBLY

[75] Inventors: Wesley K. Anderson, Schofield, Wis.; Willard H. Stanley, Sterling, Ill.

[73] Assignee: General Electric Company, Fort Wayne, Ind.

[21] Appl. No.: 65,174

[22] Filed: Aug. 9, 1979

Related U.S. Application Data

[62] Division of Ser. No. 808,805, Jun. 22, 1977 Pat. No. 4,198,583, which is a division of Ser. No. 660,880, Jul. 31, 1975, Pat. No. 4,054,767.

[51] Int. Cl.$^3$ .......................................... H02K 15/00
[52] U.S. Cl. ...................................... 29/596; 310/71
[58] Field of Search .................... 29/596, 598; 310/71, 310/68 R, 68 B, 68 C; 339/14, 14 P; 200/289, 307

[56] References Cited

U.S. PATENT DOCUMENTS

| | | | |
|---|---|---|---|
| 2,249,618 | 7/1941 | Perkins | 339/198 |
| 2,305,093 | 12/1942 | Leflare et al. | 200/80 |
| 2,603,732 | 7/1952 | Hinman | 200/164 |
| 2,686,297 | 8/1954 | Hutt | 339/14 |
| 2,710,949 | 6/1955 | Happe et al. | 339/258 |
| 2,792,561 | 5/1957 | Cohen | 339/14 X |
| 3,313,905 | 4/1967 | Zagorski | 200/303 |
| 3,358,261 | 12/1967 | Gaines et al. | 339/14 |
| 3,381,197 | 4/1968 | Waters et al. | 318/221 |
| 3,440,592 | 4/1969 | Zelle | 339/14 |
| 3,477,001 | 11/1969 | Spinrad et al. | 310/71 X |

*Primary Examiner*—Carl E. Hall
*Attorney, Agent, or Firm*—Joseph E. Papin

[57] ABSTRACT

A method of assembling a switch and terminal assembly and mounting it to a dynamoelectric machine with the switch and terminal assembly being operable generally for controlling at least winding circuitry of the dynamoelectric machine. In this method, the switch and terminal assembly is provided with a device for connecting the dynamoelectric machine to ground. The switch and terminal assembly is secured to an electrical conductive component of the dynamoelectric machine by an electrical conductive mounting member, and such member is coupled in ground circuit relation with the device.

A method of assembling a switch and terminal assembly is also disclosed.

16 Claims, 9 Drawing Figures

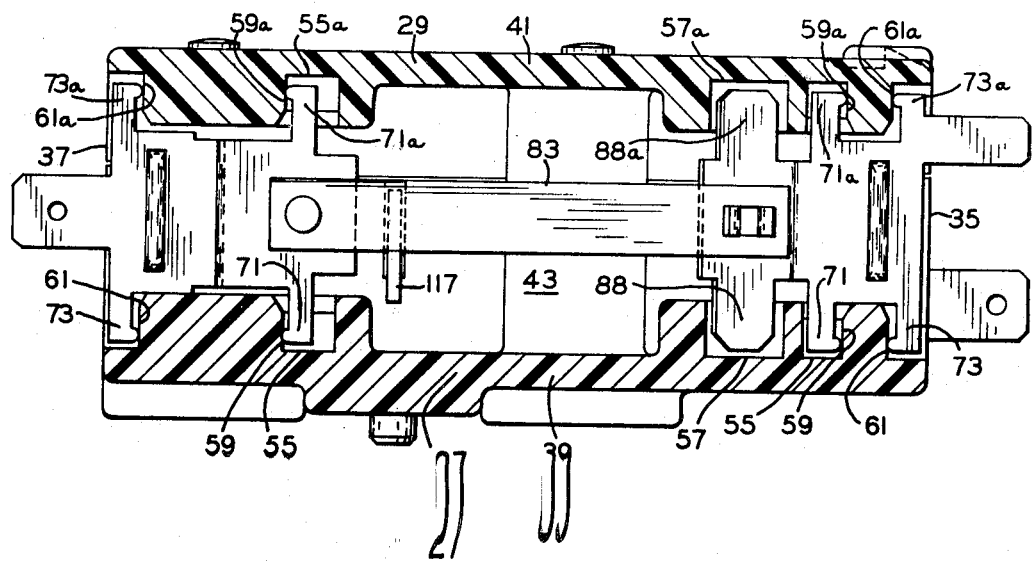
FIG. 5
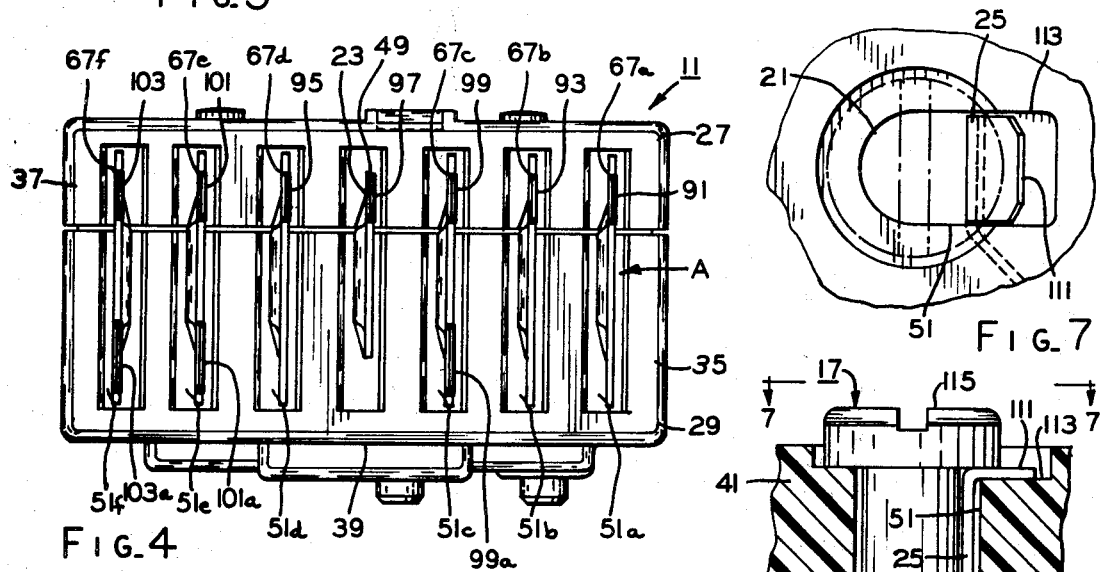
FIG. 4  FIG. 7  FIG. 6
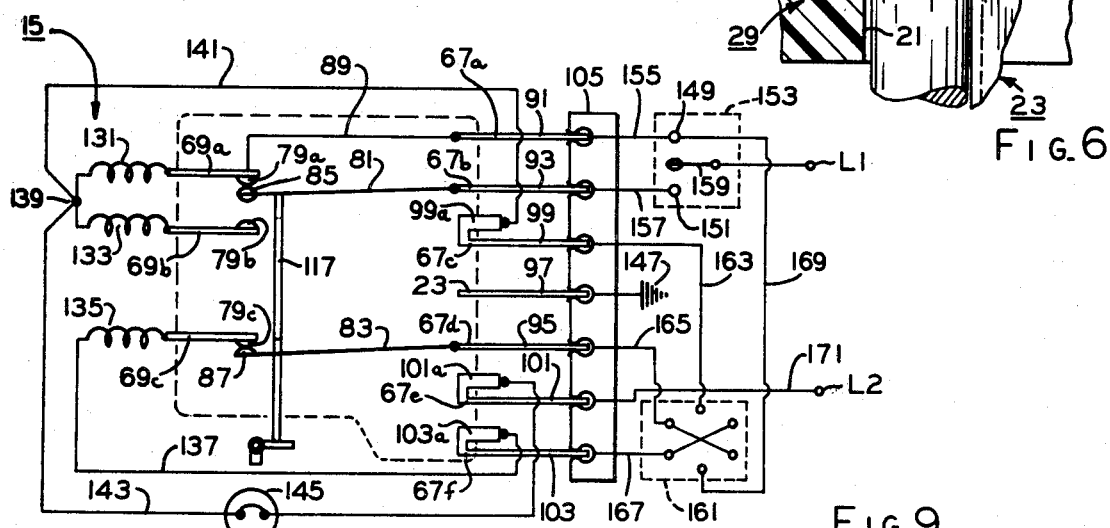

METHOD OF ASSEMBLING AND MOUNTING A SWITCH AND TERMINAL ASSEMBLY

CROSS-REFERENCE TO RELATED APPLICATION

This application is a division of co-pending application Ser. No. 808,805 filed June 22, 1977, Pat. No. 4,198,583, which in turn, is a division of parent application Ser. No. 660,880 filed July 31, 1975 (now U.S. Pat. No. 4,054,767 issued Oct. 18, 1977), and such co-pending and parent applications are specifically incorporated by reference herein.

FIELD OF THE INVENTION

This invention relates generally to dynamoelectric machines and in particular to a method of assembling a switch and terminal assembly and mounting it to a dynamoelectric machine and a method of assembling a switch and terminal assembly.

BACKGROUND OF THE INVENTION

In the past, various types of switch and terminal assemblies have been mounted to a dynamoelectric machine externally thereof, and such switch and terminal assemblies were operable generally to at least selectively control the winding circuitry of the dynamoelectric machine. In some instances, other auxiliary circuits were connected through these past switch and terminal assemblies and selectively controlled thereby. One such past switch and terminal assembly is disclosed in U.S. Pat. No. 3,313,905 issued to W. A. Zagorski and in U.S. Pat. No. 3,381,197 issued to J. L. Waters et al. Other types of such past switch and terminal assemblies for controlling the winding circuitry of a dynamoelectric machine were mounted internally thereof on terminal boards or the like, as shown in U.S. Pat. No. 2,305,093 issued to J. Leflar et al. Still another type of such past electrical switches were generally totally enclosed and mounted interiorly of the dynamoelectric machine as illustrated in U.S. Pat. No. 2,603,732 issued to M. B. Hinman.

It is desirable, if not necessary in some dynamoelectric machine or electric motor applications, to effect grounding of the dynamoelectric machine, and various and sundry grounding arrangements have been utilized in the past. For instance, a lead-in metallic conduit has been connected in ground circuit relation with a dynamoelectric machine or, in some instances, a conduit or terminal box therefor; however, at least one of the more apparent disadvantageous or undesirable features of this particular grounding arrangement is believed to involve the economics of providing such conduit boxes and metallic lead-in conduits. In another of such past grounding arrangements, a ground wire was run through the lead-in metallic conduit for connection with a component of the dynamoelectric machine, and it is believed that at least one of the disadvantageous or undesirable features of this particular grounding arrangement is generally the same as that discussed above. In some of the resiliently mounted electric motors, another past grounding arrangement included a grounding strap connected between a housing part of the motor and a base therefor with such grounding strap extending across a resilient mount or ring seating such housing part on such base. At least one of the disadvantageous features of this particular past grounding arrangement is believed to be the difficulty in mounting such a grounding strap at least on a production line basis. Of course, there may be many other grounding arrangements in the prior art.

Also in the past switch and terminal assemblies mounted to dynamoelectric machines for controlling at least the winding circuitry thereof, the terminals of such past electrical switches had connector sections or ends externally of the switch casing. These terminal connector sections were adapted to receive a sleeve or slip-on type quick disconnect or fitting which were provided on the ends of leads for connection in circuit with the electrical switch. In some of the past electrical switches, these terminals were aligned generally in row or tier formation at the opposite ends of the switch, and the terminals were provided with either a single connector section or dual, side-by-side connector sections which were also disposed in aligned row or tier formation, as previously mentioned. At least one of the disadvantageous or undesirable features of such past switch and terminal assemblies was that in some applications as many as eight to twelve individual leads were connected with the various switch terminals which was, of course, time consuming on a production line basis as well as confusing in the event of repair or replacement in the aftermarket. Another disadvantageous or undesirable feature of such past switch and terminal assembly is believed to be that the terminal connector sections were so closely spaced with respect to each other difficulty was encountered when the quick disconnects of the leads were assembled to the terminal connector sections.

SUMMARY OF THE INVENTION

Among the several objects of the invention may be noted the provision of an improved method of assembling a switch and terminal assembly and mounting it to a dynamoelectric machine and an improved method of assembling a switch and terminal assembly which overcome the disadvantageous or undesirable features discussed hereinabove, as well as others, with respect to the prior art; the provision of such improved assembling and mounting method which automatically provides a ground circuit for the dynamoelectric machine; the provision of such improved methods wherein a grounding device in such switch and terminal assembly is adapted for coupling in ground circuit relation with means for securing the switch and terminal assembly to the dynamoelectric machine; the provision of such improved methods wherein at least some of the switch terminal connector sections are off-set from others thereof; the provision of such improved methods in which at least some of the switch terminal connector sections are adapted to receive a multiple connector assembly having leads predeterminately arranged for connection in circuit relation with the switch and terminal assembly; and the provision of such improved methods employing components which are simplistic in nature or design, economically manufactured, and easily assembled or connected. These as well as other objects and features of the present invention will in part apparent and in part pointed out hereinafter.

In general, there is provided a method in one form of the invention for assembling a switch and terminal assembly and mounting it to a dynamoelectric machine, the switch and terminal assembly being operable generally for controlling the energization of at least winding circuitry in the dynamoelectric machine. This assembling and mounting method includes at least the steps of: providing in the switch and terminal assembly a device adapted for connecting the dynamoelectric machine to ground; and, securing the switch and terminal assembly to an electrical conductive component of the dynamoelectric machine with an electrical conductive mounting member and coupling it in ground circuit relation with the connecting means.

Further in general and in one form of the invention; there is provided a method of assembling a switch and terminal assembly having a casing adapted for mounting to a dynamoelectric machine. This method includes disposing a plurality of terminals within the casing with each terminal having only a single, similarly shaped, electrical connector section extending generally in row formation through a wall of the casing exteriorly thereof and arranging at least another terminal within the casing with the at least another terminal having a pair of side-by-side, dissimilarly shaped electrical connector sections extending through the wall of the casing exteriorly thereof, and one of the electrical connector sections pair being shaped similar to and generally disposed in the row formation with the single electrical connector sections of the terminals in the terminal plurality.

Still in general, a method of assembling a switch and terminal assembly is provided in one form of the invention with the switch and terminal assembly being adapted to be mounted to a dynamoelectric machine and having a casing with a switch means accommodating chamber therein. This method includes the steps of: providing in the casing an opening therethrough with a slot intersecting the opening and a wall of the casing and isolating both the opening and the slot from the switch means accommodating chamber; and positioning a ground terminal in the slot with a portion thereof extending through the casing wall adapted for connection to ground and with another portion thereof extending at least in part in the opening adapted for connection in ground circuit relation to the dynamoelectric machine.

BRIEF DESCRIPTION OF THE DRAWINGS

FIG. 4 is a right-side elevational view of the switch and terminal assembly of FIG. 2 with the casing members thereof secured together;

FIG. 5 is a sectional view taken generally along line 5—5 of FIG. 2;

FIG. 6 is a partial sectional view taken generally along lines 6—6 of FIG. 2;

FIG. 7 is a partial sectional view taken generally along lines 7—7 of FIG. 6;

FIG. 9 is an exemplary schematic wiring diagram of the dynamoelectric machine and the switch and terminal assembly illustrating schematically a multiple connection means carrying a plurality of leads and adapted to be received by at least some of the terminals of the switch and terminal assembly.

Corresponding reference characters indicate corresponding parts throughout the several views of the drawings.

The exemplifications set out herein illustrate preferred embodiments of the invention in one form thereof, and such exemplifications are not to be construed as limiting in any manner the scope of the invention.

DETAILED DESCRIPTION OF THE PREFERRED EMBODIMENTS

Figure 1:
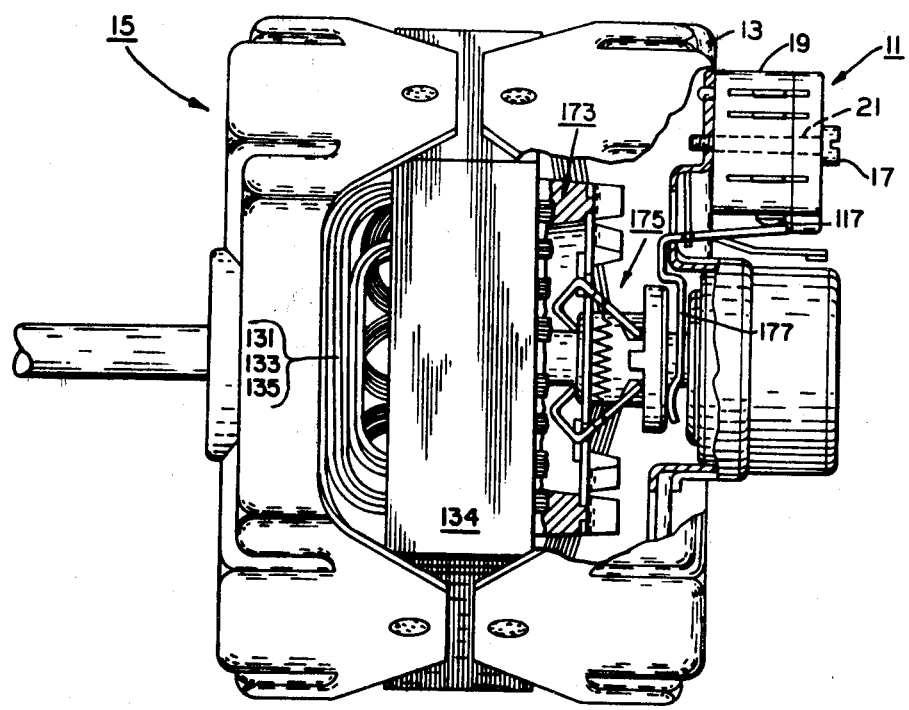
FIG. 1 is a side elevational view of a dynamoelectric machine and a switch and terminal assembly illustrating principles which may be practiced in a method of assembling a switch and terminal assembly and mounting it to the dynamoelectric machine in one form of the invention.
Figure 2:
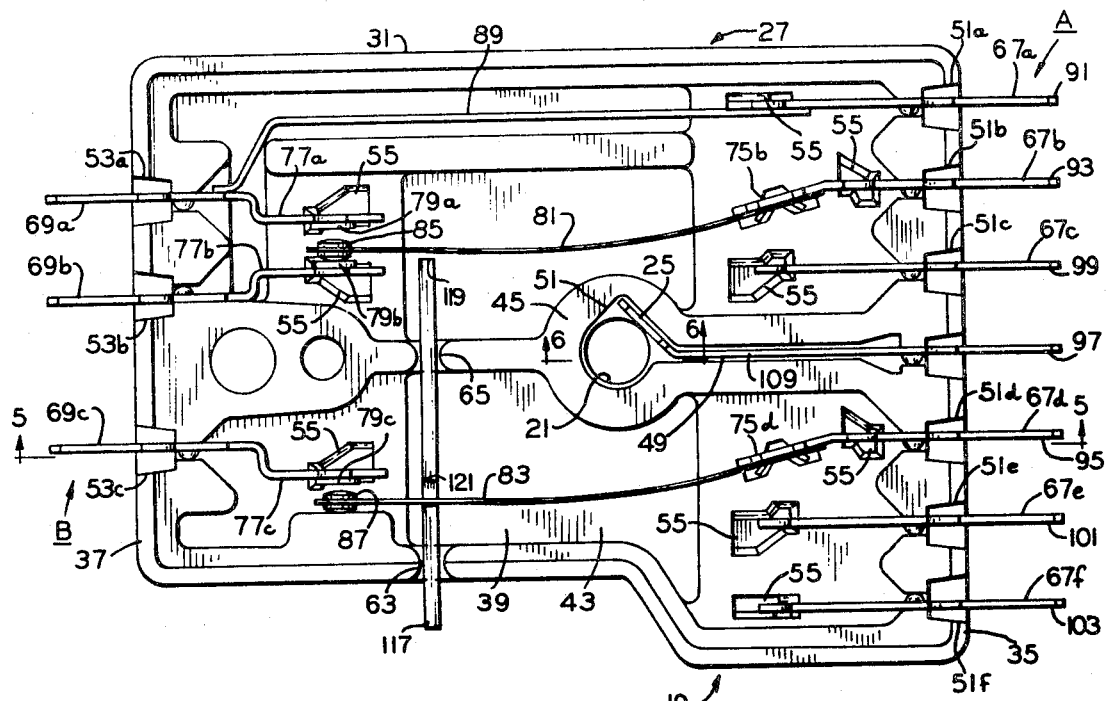
FIG. 2 is an enlarged plan view of the switch and terminal assembly of FIG. 1 with one of its casing members removed to show the internal components thereof and illustrating principles which may be practiced in a method of assembling the switch and terminal assembly in one form of the invention.

Referring now to the drawings in general, there is shown the combination of a switch device or switch and terminal assembly, indicated generally at 11, mounted to a structural component, such as for instance an electrically conductive end frame 13, of a prime mover, such as a dynamoelectric machine or electric motor 15, by an electrical conductive mounting member, such as for instance a metal screw or other suitable mounting means 17 (FIG. 1). Assembly 11 has a casing 19, and receiving means, such as an opening 21 or the like, is provided in the casing for accommodating mounting member 17 (FIGS. 2, 6 and 7). A grounding means or device, such as a ground terminal 23 (FIG. 8), is disposed in casing 19 for connecting dynamoelectric machine 15 with ground (FIGS. 2 and 9), and the ground terminal includes means, such as an integral tab or portion 25, associated with the receiving means or opening 21 for engagement or connection in a ground circuit relation with mounting member 17 upon the mounting thereby of assembly 11 to dynamoelectric machine structural component or end frame 13 (FIGS. 1 and 2).

Figure 3:
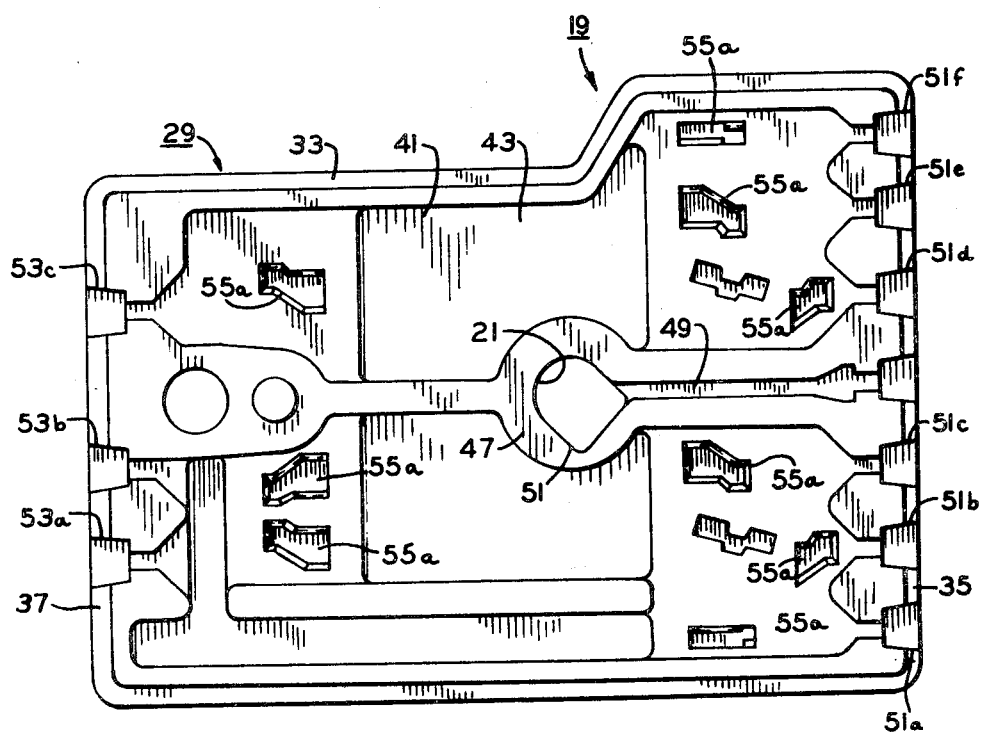
FIG. 3 is a plan view of the casing member removed in FIG. 2 showing the internal portion thereof.

More particularly and with specific reference to FIGS. 2-4, casing 19 of assembly 11 generally comprises a pair of separable casing or body members 27, 29 which are adapted to be releasably engaged or secured together. Casing members 27, 29 respectively include adjacent, generally mating peripheral wall means 31,33 which, when mated together, respectively define at least a pair of opposite casing walls or end walls 35, 37. Another pair of opposite casing walls or sidewalls 39, 41 are integrally formed between peripheral wall means 31, 33 and a switch means accommodating chamber 43 is defined in casing 19 between the peripheral wall means and the sidewalls.

A pair of adjacent generally mating portions 45, 47 are also provided in casing 19 generally intermediate of chamber 43, and the mating portions are integrally formed with sidewalls 39, 41 and peripheral wall means 31, 33, respectively. When mated together, mating portions 45, 47 generally define opening or passage means 21 which extends completely through casing 19 intersecting with sidewalls 39, 41 and which includes a ground terminal receiving slot or aperture 49 is also defined by the mating portions. One end of ground slot 49 intersects with end wall 35 and the other end thereof intersects with a recess 51 provided generally about opening 21 generally between the one end of the ground slot and casing sidewall 41. As previously noted, opening 21 is provided for accommodating mounting member 17, and ground slot 49 and recess 51 are provided to accommodate ground terminal 23, as discussed in detail hereinafter. It may be noted that mating portions 45, 47 generally isolate or separate opening 21, ground slot 49 and recess 51 from switch means accommodating chamber 43.

Casing members 27, 29 are provided with a plurality of mating recesses which define slots or grooves 51a-51f and slots or grooves 53a-53c of generally oblong configurations extending through opposite end walls 35, 37 of casing 19 so that the interior end portions of the slots open into chamber 43. Slots 51a-51f and slots 53a-53c are disposed or arranged generally in spaced apart, row or tier formation longitudinally or vertically with respect to each other. and ground slot 49 is also arranged in the row or tier formation with slots 51a-51f; however, the ground slot is generally isolated from casing chamber 43, as previously mentioned. Within chamber 43 and adjacent each interior end portion of slots 51b-51f and slots 53a-53c, a plurality of mating or aligned pairs of notches 55, 55a are molded or otherwise disposed in sidewalls 39, 41 of casing members 27, 29 for positioning engagement or association with a terminal of assembly 11, as discussed hereinafter. In association with each of slots 51a-51f and slots 53a-53c there is provided spaced pairs of oppositely facing seating, positioning or mounting surfaces 59, 61 and 59a, 61a on casing members 27, 29 (as best seen in FIG. 5) adapted to be gripped by the terminals of assembly 11, as also discussed hereinafter. Seating surfaces 59, 59a are provided within the mating notches 55, 55a of casing sidewalls 39, 41, and surfaces 61, 61a are provided at least adjacent casing end walls 35, 37. Another plurality of mating or aligned pairs of grooves, as indicated at 57, 57a are also molded or otherwise provided in sidewalls 39, 41 of casing members 27, 29 for stability purposes with respect to those terminals which carry switch blades, as discussed hereinafter. To complete the description of casing 19, a pair of pushbutton receiving guides or recesses 63, 65 are generally transversely provided through peripheral wall means 31 and mating portion 45 of casing member 29, and the pushbutton receiving guides extend generally normally with respect to slots 49, 51a-51f and slots 53a-53c, as best seen in FIG. 2. The particular shapes of slots 49, 51a-51f and 53a-53c, notches 55, 55a seating surfaces 59, 61 and 59a, 61a, grooves 57, 57a and the arrangements thereof with respect to each other are illustrated herein only for the purpose of disclosure, and it is contemplated that other shapes and arrangements may be provided within the scope of the invention so as to meet the objects and advantageous features thereof.

As shown in FIG. 2, two stacks or pluralities A and B of terminals 67a-67f and 69a-69c are provided in assembly 11 extending through slots 51a-51f and 53a-53c provided therefor in casing end walls 35, 37 so as to be at least in part exposed exteriorly of assembly 11, respectively, and ground terminal 23 which extends through ground slot 49 is included in terminal plurality A. It may be noted that terminals 67a-67f and 69a-69c and casing members 27, 29 include means, as discussed below, which have a tendency for securing the casing members together and for mounting the terminals. For instance, each of terminals 67a-67f, 69a-69c are provided with opposite pairs of sapced apart abutment surfaces, such as fingers 71, 73 and 71a, 73a or the like, which are disposed in releasable gripping, frictional or displacement preventing engagement with opposite pairs of seating surfaces 59, 61 and 59a, 61a provided therefor in each of slots 51a-51f, 53a-53c of casing members 27, 29 (as best seen in FIG. 5). In this manner, terminals 67a-67f and 69a-69c not only secure casing members 27, 29 together but also are mounted so as to be generally maintained against displacement from slots 51a-51f, 53a-53c. Of course, while the gripping engagement of fingers 71, 73 and 71a, 73a of terminals 67a-67f and 69a-69c with seating faces 59, 61 and 59a, 61a of slots 51a-51f and 53a-53c is described and and shown herein as having te tendency to maintain the terminals generally against displacement from the slots and to secure casing members 27, 29 together, it is contemplated that other means for securing the casing members together and for mounting the terminals may be provided within the scope of the invention so as to generally conform with the objects and advantageous features thereof, Of course, it is also contemplated that the casing members and terminals may be assembled together without the interaction or securing engagement therrebetween, as illustrated hereinabove merely for purposes of disclosure, so that the casing members may be generally loosely associated with each other, i.e., releasably engaged with each other, within the scope of the invention so as to meet the objects and advantageous features thereof. Further, if a more detailed description of the terminals, casing members and the releasable engagement effected therebetween is desired reference may be had to U.S. Pat. No. 3,313,905 issued to W. S. Zagorski on Apr. 11, 1967 which is specifically incorporated herein by reference.

Terminals 67b and 67d of terminal plurality A and terminals 69a-69c of terminal plurality B respectively include switch means supporting sections 75b, 75d and 77a-77c interiorly of casing chamber 43 and to which switch means or switch members are attached by suitable means, as discussed hereinafter and as shown in FIG. 2. A plurality of fixed contacts or switch members 79a-79c are mounted in electrical conductive relation by suitable means well known in the art to switch means supporting sections 77a-77c of terminals 69a-69c, and fixed contacts 79a, 79b are disposed in opposed or facing relation with each other. A pair of movable switch members, such as contact elements or switch blades 81, 83, have one of their opposite ends fixedly mounted in electrical conductive relation by suitable means well known in the art to switch means supporting sections 75b, 75d of terminals 67b, 67d. While switch blade 81 is disclosed as a "slow-acting" blade, it is contemplated that a "snap-acting" blade may also be utilized within the scope of the invention so as to generally conform with the objects and advantageous features thereof. A switch member or movable or double contact 85 is carried on the other end of switch blade 81 for selective electrical or circuit making and breaking engagement with opposed fixed contacts 79a, 79b, and another switch member or movable contact 87 is carried on the other end of switch blade 83 for selective electrical or circuit making and breaking engagement with fixed contact 79c. It may be noted that terminals 67b, 67d which carry switch blades 81, 83 are each provided with an oppositely extending pair of arms 88, 88a which are respectively disposed within grooves 57, 57a molded in sidewalls 39, 41 of casing members 27, 29 so as to provide a degree of stability therebetween when the casing members are assembled together and also to permit the desired degree of deflection or bending of switch blades 81, 83, as best seen in FIG. 5. Terminal 67a has its interior end within chamber 43 of casing 19 connected in circuit relation by a buss or other electrical connector 89 with switch means supporting section 77a of terminal 69a, and terminals 67c, 67e and 67f of terminal plurality A may be dummy terminals, if desired, to provide additional connections for assembly 11.

In terminal plurality A, terminals 67a, 67b and 67d are each provided with only a similarly shaped, single electrical connector section or male extension 91, 93, 95 which extend exteriorly of end wall 35 of casing 19, and ground terminal 23 is also provided with only a single electrical connector section or male extension 97 having a shape generally similar to the electrical connector sections 91, 93, 95 and also extending exteriorly of end wall 35, as best seen in FIGS. 2, 4 and 5. Dummy terminals 67c, 67e, 67f are each provided with dual or pairs of dissimilar electrical connector sections or male extensions 99, 99a, 101, 101a, 103, 103a extending exteriorly of end wall 35 and arranged generally in side-by-side relation. It may be noted that male extensions 99, 101, 103 of dummry terminals 67c, 67e, 67f have a shape generally similar to male extensions 91, 93, 95, 97 of terminals 67a, 67b, 67d and ground terminal 23, and it may also be noted that the similarly shaped male extensions 91-103 are arranged in spaced relation and generally in row or tier formation, i.e., generally in vertical or longitudinal alignment, with each other adjacent or exteriorly of end wall 35 of casing 19. Of couse, the other or dissimilarly shaped extensions 99a, 101a, 103a of dummy terminals 67c, 67e, 67f may also be disposed in vertical or row formation if desired. In this manner, the provision of the similarly shaped male extensions 91-103 in alignment or row formation facilitates the manual electrical connection therewith of a multiple connection assembly 105, as illustrated schematically in FIG. 9, having a plurality of female receptacles therein into which male extensions 93-103 may be fitted or received in circuit relation; therefore, a plurality of electrical connections or circuits may be concurrently made with or through assembly 11 by the engagement of multiple connection assembly 105 with the similarly shaped male extensions 91-103 of terminals 67a-67f of terminal plurality A. While dummy terminals 67c, 67d, 67f are shown and described hereinabove as extending through casing end wall 35, it is contemplated that such dummy terminals may either be omitted from assembly 11 or else disposed in another wall of casing 19 defined by the mating peripheral wall means 31, 33 of casing members 27, 29 so as to generally conform with the objects and advantageous features of the invention at least in one form thereof. In the event dummy terminals 67c, 67e, 67f are omitted from assembly 11 or else disposed in another wall thereof, as suggested above, then it may be noted that only the similarly shaped, single electrical connector sections 91-97 of terminals 67a, 67b, 67d and ground terminal 23 would extend exteriorly of casing end wall 35 generally in aligned or row formation so as to receive multiple connector assembly 105. Further, while seven terminals and three terminals are disclosed and described as generally comprising terminal plurality A and terminal plurality B, respectively, it is contemplated that a greater or a lesser amount of such terminals may be employed in each of the terminal pluralities according to the connection requirements for any given switch and terminal assembly, such as assembly 11, within the scope of the invention so as to meet the objects thereof.

Figure 8:
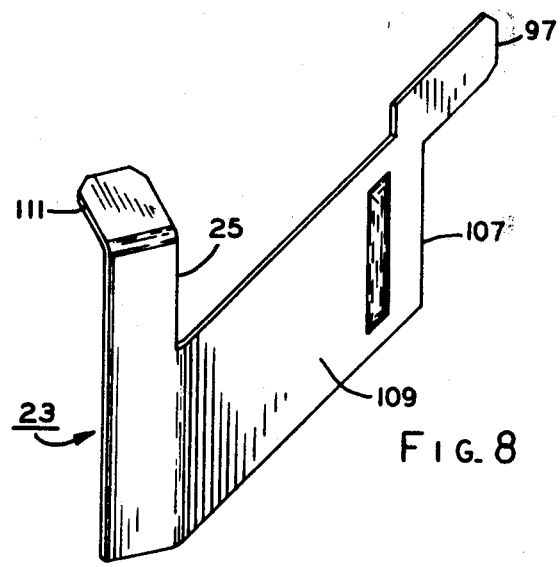
FIG. 8 is an isometric view of a ground terminal utilized in the switch and terminal assembly.

Referring now to FIGS. 2 and 6–8, grounding device or ground terminal 23 is provided with a body 10 preferably formed of any suitable electrical conductive metal having at least some resilient characteristics. Body 107 has a generally flat, elongate, intermediate part 109 which is disposed or mounted in slot 49 defined by mating portions 45, 47 of casing members 27, 29. Single electrical connector section 97 of ground terminal 23 is integrally formed with intermediate part 109 adjacent its rightward end (as best seen in FIGS. 2 and 8) so as to extend exteriorly of casing end wall 35. Tab 25 is integrally formed with intermediate part 109 of ground terminal body 107 adjacent its leftward end (as best seen in FIGS. 2 and 8), and the tab extends generally perpendicularly from the intermediate portion being disposed in recess 51 generally adjacent opening 21 defined by mating portions 45, 47 of casing members 27, 29. A distal or free end 111 of tab 25 (as best seen in FIGS. 7 and 8) is bent from the plane thereof and terminates adjacent an exterior recess 113 provided in sidewall 41 of casing member 29 so as to intersect with opening 21 therein. Distal end 111 of tab 25 is adapted to be mechanically engaged and connected in ground circuit relation with a head or abutment portion 115 of mounting member or screw 17 when the screw is assembled through opening 21 of casing 19 into threaded or mounting engagement with end frame 13 of dynamoelectric machine 15 for mounting assembly 11 thereto and for coupling the end frame in ground circuit relation with ground terminal 23 (as best seen in FIGS. 1 and 6). It may be noted that distal end 111 of tab 25 is adapted to be deformed generally toward exterior recess 113 of casing member 29 by head 115 of screw 17 when assembly 11 is so mounted to dynamoelectric machine 15, and the inherent resiliency of the metal from which ground terminal 23 is formed is contemplated to maintain the grounding connection between screw head 115 and distal end 111 of tab 25 upon the deformation thereof.

As shown in FIG. 2, a generally flat elongated pushbutton or plunger 117 is reciprocally mounted in guides 63, 65 provided therefor in casing member 27, and an upper or free end 119 of the pushbutton is juxtaposed with switch blade 81 for operating engagement therewith to effect the making and breaking of movable contact 85 with opposed fixed contacts 79a, 79b upon the operating reciprocal movement of the pushbutton. To complete the description of assembly 11, switch blade 83 passes through a slot 121 provided in pushbutton 117, and the upper end portion of the pushbutton slot is engageable with the switch blade to prevent the displacement of the pushbutton from casing 19 while the lower end portion of the pushbutton slot is operatively engageable with the switch blade to effect the making and breaking of movable contact 87 with fixed contact 79c upon the operating reciprocal movement of the pushbutton.

Referring again to the drawings in general and recapitulating, at least in part, with respect to the foregoing, a method is provided in one form of the invention for assembling switch and terminal assembly 11 and mounting it to dynamoelectric machine 15, the assembly being adapted for operation generally to control at least the energization of winding circuitry, as discussed in detail hereinafter, of the dynamoelectric machine (FIGS. 1 and 9). This assembly and mounting method includes at least the steps of: providing in assembly 11 the grounding device or ground terminal 23 adapted for connecting dynamoelectric machine 15 to ground (FIGS. 2 and 6); and, securing the assembly to an electrical conductive component, such as end frame 13 of the dynamoelectric machine with mounting member 17 and coupling it in ground circuit relation with the ground terminal (FIGS. 1, 6 and 7).

More particularly, casing member 27 is positioned generally as shown in FIG. 2, and pushbutton 117 is placed in pushbutton receiving guides 63, 65 of the casing member. Terminals 67a–67f and 69a–69c are inserted or otherwise positioned or arranged into the respective slots 51a–51f and 51a–51c provided therefor in casing member 27 so that the respective similar electrical connector sections 91–103 are aligned generally in row formation exteriorly of casing wall 35, and upon such assembly of the terminals into their respective slots, abutment surfaces or fingers 71, 73 of each of the terminals are entered into gripping or frictional engagement with the cooperating opposite seating surfaces 59, 61 in each of such slots in the casing member. Of course, when terminals 67b, 67d are so mounted to casing member 27, their respective arms 88 are also disposed in the cooperating grooves 57 provided therefor in sidewall 39 of the casing member, and switch blades 81, 83 carried by respective switch means supporting sections of these two terminals are disposed so that movable contacts 85, 87 thereof are respectively made with and broken from fixed contacts 79b, 79c of terminals 69b, 69c. Switch blade 83 is also placed into groove 121 of pushbutton 117.

Ground terminal 23 is also placed or otherwise positioned or arranged in that portion of slot 49 defined by mating portion 45 of casing member 27 with tab 25 of the ground terminal positioned or otherwise extending, at least in part, in recess 51 of the casing member adjacent opening 21 therethrough. Of course, ground terminal 23 may be assembled with casing member 27 before, after or concurrently with the assembly thereto of terminals 67a–67f and 69a–69c, and pushbutton 117 may be assembled with the casing member either prior to or after the assembly of terminals 67b, 67d with the casing member. Thereafter, peripheral wall means 31, 33 and mating portions 45, 47 of casing members 27, 29 may be fitted or assembled together generally in alignment so as to enclose chamber 43. When casing members are so mated, abutment surfaces or fingers 71a, 73a of each terminal 67a–67f and 69a–69c are positioned in gripping engagement with opposite seating surfaces 59a, 61a provided in each portion of slots 51a–51f and 53a–53c in casing member 29, and arms 88a of terminals 69b, 69d are received in the cooperating grooves 57a provided therefor in sidewall 41 of casing member 29. As previously mentioned, the gripping or frictional engagement of terminal fingers 71, 73 and 71a, 73a with their cooperating seating surfaces 59, 61 and 59a, 61a tend to secure casing members 27, 29 together as well as mount or otherwise capture or secure terminal 67a–67f and 69a–69c therebetween. Of course, the alignment or mating of mating portions 45, 47 of casing members 27, 29 generally isolates ground slot 49, recess 51 and opening 21 from chamber 43, as previously mentioned, so that ground terminal 23 is electrically isolated from any of the electrically hot or current carrying components within the chamber. Of course, the foregoing also illustrates a method of assembling switch and terminal assembly 15, in one form of the invention so as to meet the objects and advantages thereof.

With the component parts of assembly 11 so assembled as described above, it may then be mounted or otherwise secured to dynamoelectric machine 15. To effect such mounting, assembly 11 may be disposed in its desired position abutted or otherwise engaged with on end frame 13 of dynamoelectric machine 15, as shown in FIG. 1, and the threaded shank of mounting screw 17 is inserted moved or otherwise passed through opening 21 in assembly 11 into threaded engagement with the end frame. Of course, in the alternative, mounting screw 17 may be at least in part inserted through opening 21 prior to the disposition of assembly 11 on dynamoelectric machine end frame 13. Upon the establishment of the threaded engagement between mounting screw 17 and dynamoelectric machine end frame 13, head 115 of the mounting screw is advanced into mechanical engagement or abutment with distal end 111 of tab 25 of ground terminal 23 so as to deform the ground terminal distal end toward exterior recess 113 in sidewall 41 of casing member 29, as shown in FIG. 6. In this manner, it may be noted that the threaded engagement or coupling of mounting screw 17 with dynamoelectric machine end frame 13 is effective to mount or otherwise secure assembly 11 to dynamoelectric machine 15, and the mechanical engagement or coupling of mounting screw head 115 with the distal end 111 of tab 25 of ground terminal 23 also automatically completes a ground circuit from the dynamoelectric machine end frame 13, through mounting screw 17 and the ground terminal to the electrical connector section 97 thereof which is adapted for connection electrically to ground. Thus, mounting screw 17 comprises a means movable with respect to both assembly 11 and dynamoelectric machine 15 into assembled engaging relation with ground terminal 23 and dynamoelectric machine end frame 13 for securing the assembly to the dynamoelectric machine end frame and for electrically connecting the ground terminal in ground circuit relation with the dynamoelectric machine end frame.

FIG. 9 shows switch and terminal assembly 11 utilized or otherwise operable as a switch and electrical circuit making unit for controlling the windings or winding circuit of dynamoelectric machine 15 which is shown, for example, as a single phase multi-speed induction motor. In this illustrated exemplification, dynamoelectric machine 15 has two run or main field windings or winding means 131, 133 (e.g., four pole and six pole windings) selectively energized to provide two different speeds of operation and a start or auxiliary winding or winding means 135 connectable in parallel with run winding 133 during starting conditions. These windings may be arranged on a stationary assembly 134 of dynamoelectric machine 15 (as best seen in FIG. 1) and interconnected in any suitable manner well known in the art. Run windings 131, 133 and start winding 135 are respectively connected with terminals 69a, 69b and 69c, and the start winding is also connected in series circuit relation with electrical connector section 103a of dummy terminal 67f by a lead 137. A connection point 139 is provided between run windings 131, 133, and a pair of leads 141, 143 are respectively connected between connection point 139 and electrical connector sections 99a, 101a of dummy terminals 67c, 67e. A standard terminal protector device 145 may be interposed in lead 143 if desired. The above-discussed connections of the windings to the various terminals may be made by the use of quick disconnects, if desired, as is well known to the art.

As previously mentioned, multiple connection assembly 105 is provided with a plurality of female receptacles which are removably and electrically coupled with electrical connector sections 91–103 of terminals 67a–67f, respectively, and of course, ground terminal 23 is connected to a ground at 147 through the multiple connection assembly. Multiple connection assembly 105 connects electrical connector sections 91, 93 of terminals 67a, 67b with terminal posts 149, 151 of a single pole double throw speed selector switch 153 through leads 155, 157. Speed selector switch 153 has a movable arm 159 for circuit making engagement with its cooperating posts 149, 151, and the arm is connected in circuit relation with a line terminal L1. A double pole double throw reversing switch of a type well known to the art is illustrated schematically at 161 for controlling the direction of current through start winding 135 and, consequently, the direction of rotation of motor 15. Multiple connection assembly 105 respectively connects electrical connector sections 99, 95, 103 of dummy terminals 67c, 67d, 67f to reversing switch 157 through leads 163, 165, 167. Another lead 169 is connected between reversing switch 161 and terminal post 149 of speed selector switch 153. To complete the description of the exemplary circuit of FIG. 9, multiple connector assembly 105 also connects electrical connector section 101 of dummy terminal 67e to a line terminal L2 through another lead 171.

Referring now to FIG. 1, dynamoelectric machine 15 is provided with a rotatable assembly 173 which is rotatably mounted within stationary assembly 134 and driven in response to the energization of windings 131, 133, 135 of the dynamoelectric machine, as is well known in the art. A centrifugal switch device 175 also of a type well known in the art is conjointly rotatable with rotatable assembly 173 and axially movable relative thereto between a start or stand still position and an axially advanced or run position. A lever 177 is pivotally mounted to end frame 13 having one end driven by centrifugal switch device 175 and the other end disposed in driving or operating engagement with the exterior end of pushbutton 117 of assembly 11. When dynamoelectric machine 15 is de-energized, centrifugal switch device 175 is in its stand still position pivoting lever 177 so as to exert a force on pushbutton 117 of assembly 11 urging switch blades 81, 83 upwardly to engage contacts 85, 87 thereof with fixed contacts 79a, 79c, as shown in FIG. 9. Of course, while the combination of centrifugal switch device 175 and lever 177 are disclosed as means for actuating assembly 11, it is contemplated that the assembly may be actuated by other means or by the centrifugal switch device itself within the scope of the invention so as to be commensurate with the objects thereof.

In order to effect operation of dynamoelectric machine 15 at its high speed and with reference to FIG. 9, arm 159 of speed selector switch 153 is engaged with its cooperating post 149 thereby to connect line terminal L1 with one side of four pole run winding 131 through leads 155, terminal 67a, buss 89 and terminal 69a. The other side of run winding 131 is also connected through winding connection point 139, lead 143, dummy terminal 67e and lead 171 to line terminal L2. At the same time, start winding 135 is also energized through reversing switch 161 which may be connected across line terminals L1, L2 to effect current flow through lead 165, terminal 67d, switch blade 83, terminal 79c, the start winding, lead 137, dummy terminal 67f and lead 167. In this manner, both run and start windings 13, 135 are energized to effect the starting operation of dynamoelectric machine 15, and as it comes up to speed, centrifugal switch mechanism 175 is actuated from its start position to its run position, as is well known in the art, allowing lever 177 to pivot so as to alleviate the force exerted thereby on pushbutton 117 of assembly 11, FIG. 1. When such force is removed from pushbutton 117, the resilient forces of switch blades 81, 83 move the pushbutton downwardly so as to make movable contact 85 on switch blade 81 with fixed contact 79b and to break movable contact 87 on switch blade 83 from fixed contact 79c. Of course, the breaking of contacts 79c, 87 interrupts the circuit across reversing switch 161 to start winding 135 thereby to take it off the line.

In order to effect the operation of dynamoelectric machine 15 at its low speed, arm 159 of speed selector switch 153 is engaged with its cooperating post 151 thereby to connect line terminal L1 with one side of run winding 131 through lead 157, terminal 67b, switch blade 81 and terminal 69a. The other side of run winding 131 is also connected through winding connection point 139, lead 143, dummy terminal 67e and lead 177 to line terminal L2. At the same time start winding 135 is also energized through reversing switch 161 which may be connected across line terminals L1, L2 from one side of run winding 131 through lead 89, terminal 67a, lead 155, and lead 169 and also from the other side of run winding 131 through winding connection point 139, lead 141, dummy terminal 67e and lead 163. Current flow from reversing switch 161 across start winding 135 is effected through the same circuitry as previously discussed hereinabove. In this manner, both run and start windings 131, 135 are again energized to effect the starting operation of dynamoelectric machine 15, and as it comes up to speed, centrifugal switch device 175, lever 177 and pushbutton 117 are operated in the same manner as previously described hereinabove. Again, the resilient force of switch blade 81 acts to break movable contact 85 from fixed contact 79a thereby to take run winding 131 off the line and to make movable contact 85 with fixed contact 79b winding to place six pole run winding 133 across the line so that dynamoelectric machine will run at its slow speed. The resilient force of switch blade 83 acts to break movable contact 87 from fixed contact 79c thereby to interrupt the circuit across reversing switch 161 to start winding 135 so that it also is taken off the line. Further, the breaking of movable contact 85 from fixed contact 79a acts to take the reversing switch off the line so long as run winding 133 remains energized to operate dynamoelectric machine 15 at its slower speed.

While assembly 11 is disclosed in combination with a single phase, multi-speed induction motor, it is to be understood that such assembly may also be employed in combination with other types of motors, and it is also contemplated that such assembly may be utilized with or without multiple connection assembly 105 within the scope of the invention. Further, in some applications of assembly 11, the switch means portion thereof including switch blade 83 may be employed to control auxiliary circuits other than the winding circuitry of dynamoelectric machine 15, without departing from the scope of the invention and so as to meet the objects and advantages thereof.

From the foregoing, it is now apparent that a novel method of assembling a switch and terminal assembly and mounting it to a dynamoelectric machine and a novel method of assembling a switch and terminal assembly have been presented meeting the objects and advantageous features set out hereinbefore, as well as others, the changes as to the precise arrangements, shapes, details and connections to the components utilized in such novel method as well as in the steps of such novel methods may be made by those having ordinary skill in the art without departing from the spirit of the invention or the scope thereof, as set out in the claims which follow:

What is claimed is:

1. A method of assembling a switch and terminal assembly and mounting it to an electrical conductive component of a dynamoelectric machine, an electrical conductive mounting member adapted to be associated with the switch and terminal assembly and an electrically conductive component of the dynamoelectric machine, the switch and terminal assembly being operable generally for controlling at least winding circuitry of the dynamoelectric machine and including a casing having a pair of casing members adapted to define a switch means accommodating chamber within the casing and an opening through the casing isolated from the chamber, a plurality of terminals, and a grounding device adapted for connecting the dynamoelectric machine to ground, the method comprising the steps of:

capturing the terminals and the grounding device between the casing members and extending a part of the grounding device at least in part within the opening; and passing the electrical conductive mounting member at least in part through the opening and engaging a part of the electrical conductive mounting member in ground circuit relation with the grounding device part and another part of the electrical conductive mounting member in the ground circuit relation with the electrical conductive component of the dynamoelectric machine and disposing the casing in mounted relation on the electrical conductive mounting member in abutment between the dynamoelectric machine and the another part of the mounting member.

2. The method as set forth in claim 1 wherein the terminals each have at least one electrical connector section and the grounding device has a ground connector section and wherein the capturing step includes exposing the at least one electrical connector section of at least some of the terminals and the ground connector section of the grounding device generally in row formation along an exterior portion of the casing.

3. The method as set forth in claim 1 wherein the capturing step includes enclosing the switch means accommodating chamber within the casing upon the capture of the terminals and the grounding device between the casing members with at least two of the terminals each having a switch means supporting section within the switch means accommodating chamber.

4. A method of assembling a switch and terminal assembly and mounting it to a dynamoelectric machine, an electrical conductive mounting member adapted to be associated with the switch and terminal assembly and the dynamoelectric machine, the switch and terminal assembly being adapted for operation generally to control at least the energization of winding circuitry in the dynamoelectric machine and including a casing having a plurality of walls defining a switch means accommodating chamber therein and an opening between a pair of opposite walls of the casing generally isolated from the switch means accommodating chamber, a plurality of terminals, and a ground terminal, the method comprising the steps of:

assembling the terminals and the ground terminal with the casing generally at the same time with at least some of the terminals having at least one electrical connector section similar to a ground connector section of the ground terminal and extending generally in row formation therewith through another wall of the casing exteriorly of the casing and the switch means accommodating chamber therein and associating a part of the ground terminal with the opening through the casing between the opposite wall pair thereof upon the assembly of both the terminals and the ground terminal with the casing; and inserting the electrical conductive mounting member through the opening between the opposite wall pair of the casing into engagement with the ground terminal part and securing the electrical conductive mounting member to the dynamoelectric machine so as to mount the switch and terminal assembly thereto and couple the ground terminal in ground circuit relation with the dynamoelectric machine.

5. A method of assembling a switch and terminal assembly and mounting it to a dynamoelectric machine with the dynamoelectric machine having an electrical conductive component, an electrical conductive mounting member adapted to be associated with the switch and terminal assembly and the electrical conductive component of the dynamoelectric machine, and the switch and terminal assembly including a casing having a plurality of walls defining a switch means accommodating chamber in the casing, an opening through the casing between a pair of opposite walls thereof and generally isolated from the switch means accommodating chamber, a plurality of terminals, and a grounding device, the method comprising the steps of:

capturing the grounding device and at least some of the terminals generally simultaneously within another wall of the casing against displacement therefrom with the grounding device and at least a part of the at least some terminals being disposed generally in row formation along the another wall of the casing exteriorly of the switch means accommodating chamber enclosed within the casing and arranging a part of the grounding device at least adjacent the opening through the opposite wall pair of the casing at least when the grounding device and the at least part of the at least some terminals are captured in the another wall of the casing;

passing the electrical conductive mounting member through the opening between the opposite wall pair of the casing and without the switch means accommodating chamber enclosed therein subsequent to the capture of the grounding device and the at least some terminals within the another wall of the casing; and interconnecting a pair of opposite parts of the electrical conductive mounting member in both mounting relation and ground circuit relation with the electrical conductive component of the dynamoelectric machine and the grounding device part arranged at least adjacent the opening through the opposite wall pair of the casing and with the opposite parts of the electrical conductive mounting member being without the switch means accommodating chamber enclosed within the casing, respectively, and mounting thereby the switch and terminal assembly to the dynamoelectric machine between the electrical conductive component thereof and one of the parts of the electrical conductive mounting member.

6. The method as set forth in claim 5 wherein the capturing and arranging step includes disposing at least the grounding device part exteriorly of the casing.

7. The method as set forth in claim 5 comprising the additional step of attaching with the at least some terminals of the switch and terminal assembly and with the grounding device a multiple connection assembly adapted for connecting at least the winding circuitry of the dynamoelectric machine across a power source and for connecting the dynamoelectric machine in the ground circuit relation through the grounding device to a ground.

8. The method as set forth in claim 5 wherein at least some of the at least some terminals have at least one electrical connector section with the at least one electrical connector section being similar to a ground connector section of the grounding device and wherein the capturing and arranging step includes positioning the ground connector section of the grounding device and the at least one electrical connector section beyond the another wall of the casing in the row formation with each other.

9. The method as set forth in claim 8 comprising the preliminary step of providing the at least one electrical connector sections and the ground connector section with similar configurations.

10. A method of assembling a switch and terminal assembly and mounting it to a dynamoelectric machine with the dynamoelectric machine having an electrical conductive structural component, an electrical conductive mounting member adapted to mount the switch and terminal assembly with the structural component of the dynamoelectric machine, and the switch and terminal assembly including a casing having a pair of casing members, a plurality of wall means on the casing members defining a switch means accommodating chamber within the casing, an opening through the casing members and generally isolated from the chamber, a plurality of terminals each having at least one electrical connector section, and a grounding device having a ground connector section and a ground tab, the method comprising the steps of:

positioning at least some of the terminals and the ground device in one of the casing members along one of the wall means thereof and exposing at least some of the at least one electrical connector section of the at least some terminals and the ground connector section of the grounding device generally in row formation along the one wall means exteriorly of the one casing member;

placing the casing members together thereby to enclose the chamber within the casing and provide the opening therethrough and capturing the terminals between the casing members with the ground tab of the grounding device extending at least in part at least adjacent the opening;

passing the mounting member at least in part through the opening in the casing; and coupling a part of the mounting member in the ground circuit relation with the structural component of the dynamoelectric machine and another part of the mounting member in the ground circuit relation with the ground tab of the grounding device and mounting the switch and terminal assembly to the dynamoelectric machine between the structural component thereof and the another part of the mounting member.

11. The method as set forth in claim 10 wherein at least two terminals of the at least some terminals have switch means supporting sections and wherein the positioning and exposing step includes disposing the switch means supporting sections of the at least two terminals at least in part within the part of the chamber defined by the wall means of the one casing member.

12. The method as set forth in claim 11 wherein the placing and capturing step includes enclosing the switch means supporting sections of the at least two terminals within the chamber.

13. The method as set forth in claim 10 wherein the at least some of the at least one electrical connector section of the at least some terminals and the ground connector section of the grounding device have similar configurations.

14. The method as set forth in claim 10 wherein the coupling and mounting step includes threadedly engaging the part of the mounting member with the structural component of the dynamoelectric machine.

15. The method as set forth in claim 10 wherein the placing and capturing step includes disposing the at least part of the ground tab on the grounding device so as to extend at least in part through the opening exteriorly of the casing and with a free end portion of the at least part of the ground tab arranged adjacent the opening.

16. The method as set forth in claim 15 wherein the coupling and mounting step includes abutting together the at least part of the ground tab on the grounding device and the another part of the mounting member.

* * * * *